Figure 1:
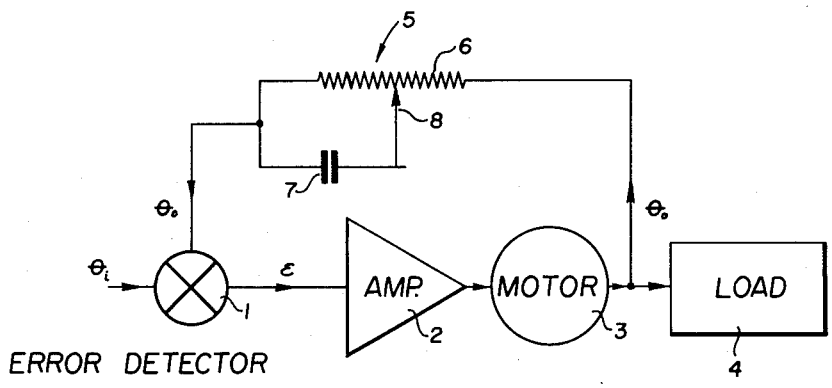

Aug. 15, 1961 M. E. SIMONTON 2,996,670
ANTIHUNTING NETWORK FOR SERVOMECHANISMS
Filed Oct. 14, 1957

INVENTOR.
Mike E. Simonton
BY
Paul B. Hunter
Attorney

United States Patent Office 2,996,670
Patented Aug. 15, 1961

2,996,670
ANTIHUNTING NETWORK FOR
SERVOMECHANISMS
Mike E. Simonton, Cupertino, Calif., assignor to Varian Associates, Palo Alto, Calif., a corporation of California
Filed Oct. 14, 1957, Ser. No. 689,939
3 Claims. (Cl. 324—100)

The present invention relates in general to antihunting networks and more particularly to a novel phase lead type compensating network for use in servomechanisms such as, for example, recorders, controllers, gyrocompasses, and the like to prevent hunting therein.

Heretofore it has been common to employ a parallel phase lead network comprising a resistor and capacitor parallel connected and provided, for example, in a parallel feedback loop of a closed loop servomechanism to prevent hunting thereof. In many of such applications the impedance of the source providing the input signal to the device remains substantially constant such that once the values of the resistance and capacitance in the parallel feedback loop have been properly selected the circuit will continue to operate without hunting.

However, in certain other applications such as, for example, in servomechanisms employed in recorders the input signal is not always derived from the same source. Consequently, the source impedance may vary over a range from a few ohms to perhaps a megaohm. It has been found that in such a circuit there is no single time constant for the values of the resistance and capacitance forming the parallel phase lead compensating network that will operate properly for a wide range of source impedances.

It has heretofore been proposed that a variable resistance be incorporated with the parallel capacitor in the compensating network, said resistance being adjustable to compensate for the increased or decreased source impedance to prevent hunting of the apparatus. It has been found, however, that if a variable resistance is utilized in parallel with the capacitor the range scale of the servomechanism is thereby altered as the D.C. impedance of the measuring circuit from which the measuring voltage is obtained for comparison with the input signal is thereby varied.

The present invention provides a resistance and capacitance phase lead antihunting compensating network wherein the resistance is obtained via a voltage divider device such that the D.C. impedance of the measuring voltage loop remains constant as the time constant of the phase lead compensating network is varied, as desired, to effect damping of the apparatus. When utilizing this novel compensating network the range scale of the servomechanism or recorder remains substantially constant for a very wide range of time constants of the phase lead network in the measuring voltage loop.

The principal object of the present invention is to provide a novel improved antihunting network for use in servomechanisms such as, for example, recorders and the like to prevent hunting therein and to provide a substantially constant range scale over a wide range of signal source impedances.

One feature of the present invention is the provision of a novel improved phase lead network comprising a resistance and capacitance connected in parallel, said resistance being derived via an adjustable voltage divider whereby the D.C. impedance of the compensating network remains substantially constant over a wide range of time constants therefor.

Another feature of the present invention is the provision of a novel electrical measuring network wherein an unknown voltage is compared with a measuring voltage derived from a standard source to obtain an error signal which is applied to the rebalance means for rebalancing the network, said measuring voltage being derived from a standard source via the intermediary of a phase lead network including a resistance and a capacitance parallel connected and said resistance being derived via an adjustable voltage divider.

Figure 2:
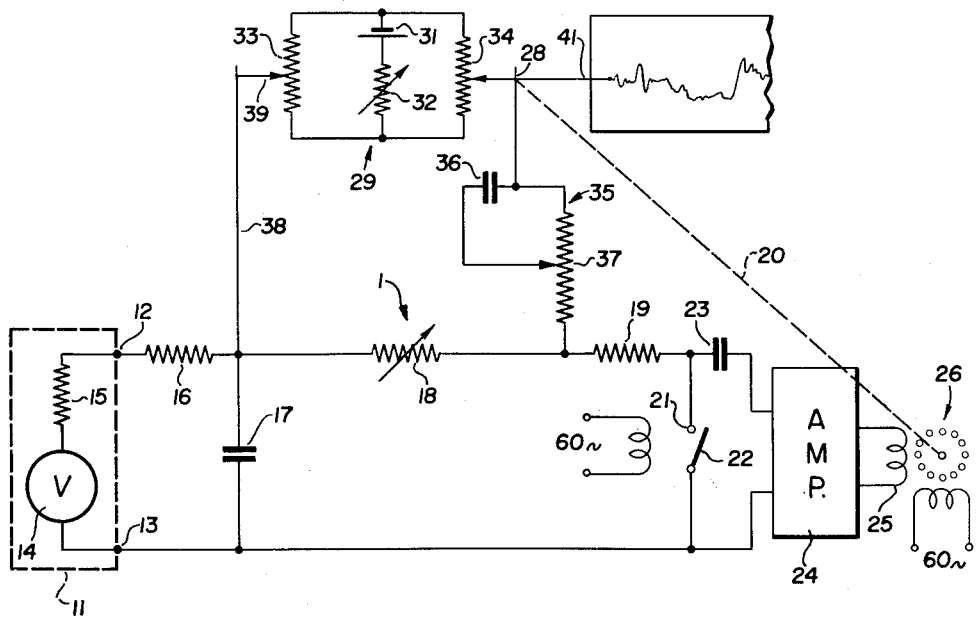

Other features and advantages will become apparent upon a perusal of the specification taken in connection with the accompanying drawings wherein, FIG. 1 is a schematic circuit diagram partly in block diagram form showing the novel phase lead compensating network of the present invention, and FIG. 2 is a schematic circuit diagram of a recorder apparatus employing the novel phase lead compensating network of the present invention.

Referring now to FIG. 1 there is shown in schematic block diagram form a typical servomechanism wherein an input signal $\theta_1$ is fed to an error detector 1. An error signal $\xi$ is derived from the error detector 1 and fed to an amplifier 2 wherein it is amplified and thence fed to a motor 3 for actuation thereof in a direction and to an extent in accordance with the error signal $\xi$. The motor 3 drives a load 4. A D.C. output signal $\theta_0$ is derived from the output of the motor 3, as by a potentiometer operatively connected thereto, and is fed back to the error detector 1 via a novel phase lead compensating network 5.

The phase lead compensating network 5 comprises a resistor 6 having a portion of its length parallel connected with a capacitor 7. Adjustable contactor 8 together with the resistor 6 forms a voltage divider and allows a desired amount of the resistance to be bypassed by the capacitor 7 to effect damping of the servomechanism network. The output signal $\theta_0$ is fed through the phase lead compensating network 5 and compared in the error detector 1 with the input signal $\theta_1$ to produce the difference error signal $\xi$.

The use of a voltage divider in the phase lead compensating network 5 provides a means for adjusting the damping of the servomechanism to prevent hunting. This compensating network provides an extremely stable null state over a wide range of time constants for the compensating network, as the D.C. component of the output signal $\theta_0$ applied to the error detector 1 is not a function of the time constant of the phase lead compensating network 5. This feature becomes very important in establishing a constant range scale in graphic recorders utilizing servomechanisms, since a recorder may be required to function satisfactorily with voltage sources requiring various amounts of phase lead to properly damp.

Referring now to FIG. 2 there is shown a typical recorder network wherein a source 11, which it is desired to measure, is connected to the recorder apparatus at terminals 12 and 13. The source 11 can be represented as a voltage source 14 in series with its internal impedance 15. The signal which is derived from the source 11 and applied to the recorder apparatus at terminals 12 and 13 is fed through a low pass filter comprising a series resistor 16 and a shunting capacitor 17. The output of the low pass filter is fed via variable resistor 18 and resistor 19 to terminal 21 of an interrupter 22. The interrupter 22 is driven via a 60 cycle signal derived from the power line such that the voltage appearing at terminal 21 is periodically shorted to the input terminal 13 at the rate of 60 times per second. Due to the interrupting action of the interrupter 22 there will be produced at terminal 21 an A.C. voltage having a phase and magnitude in variable accordance with the voltage of the source 11. This 60 cycle signal component is then coupled via coupling capacitor 23 to the input of an amplifier 24 wherein it is amplified and the output thereof applied to one phase winding 25 of a two phase reversible motor 26. The other phase of the two phase reversible motor 26 is powered from the 60 cycle line.

When a signal is present in the output of amplifier 24 it serves to drive the reversible motor 26 in a direction and to an extent dependent upon the sense and magnitude of the voltage of the source 11. The armature of the reversible motor 26 is connected via a mechanical linkage 20 to a pick-off 28 of a potentiometer 29.

The potentiometer 29 comprises a standard reference cell 31 series connected with a variable resistor 32 and both elements are parallel connected to two slide wires 33 and 34, respectively. Slide wire pick-off 28 is variably adjustable via the mechanical linkage 20 to pick off a certain voltage from the slide wire 34, the magnitude of said voltage being a function of the position of the pick-off 28 thereon. The voltage picked off the slide wire 34 by the pick-off 28 is then fed via a parallel lead network 35 comprising a capacitor 36 and voltage divider 37 through variable resistor 18 and thence returned to the potentiometer network 29 via lead 38 and pick-off 39, said pick-off 39 being adjustable, as desired, along the length of the slide wire 33. The magnitude of resistor 19 is very much greater than the magnitude of resistor 18 such that the measuring current derived from the potentiometer will be confined to the measuring loop including the compensating network 35, the error detecting resistor 18 and the potentiometer 29.

In operation, a signal, which it is desired to measure, is derived from source 11 and applied to terminals 12 and 13 of the recorder apparatus. Resistance 16 and capacitor 17 serve as a low pass filter for filtering out undesired signals such as, for example, 60 cycle hum produced by the motor 26. The output signal of the filter, taken across capacitor 17, is compared with a measuring voltage in an error detector 1 which comprises variable resistor 18. The measuring voltage is obtained from the potentiometer 29 via the motor actuated pick-off 28 and applied to the error detector 1 via the lead compensating network 35. The difference in the measuring voltage and the applied signal constitutes the error signal ξ and is fed through resistor 19 to terminal 21 of the 60 cycle interrupter 12.

The error signal ξ is interrupted at 60 cycles per second and the 60 cycle component thereby produced is propagated through coupling capacitor 23 to the amplifier 24 wherein it is amplified and applied to one phase winding 25 of the two phase reversible motor 26. The amplified error signal ξ present in phase winding 25 of the motor 26 serves to drive the reversible motor 26 in a direction and to an extent dependent upon the sense and magnitude of the error signal. When the motor 26 is in operation it serves to drive the pick-off 28 along the slide wire 34 of the potentiometer 29 in such a direction to pick off a measuring voltage therefrom of a magnitude sufficient to produce a voltage drop across error detecting resistor 18 equal and opposite to the magnitude of the voltage produced by the source under measurement.

The parallel lead compensating network 35 is provided to compensate for the substantial inertia of the motor 26 and mechanical linkage 20 by increasing the apparent measuring voltage as seen by the error detector 1, the amount of said increase being a function of the rate at which the pick-off 28 is moving along the slide wire 34. The apparent increase in the measuring voltage as seen by the error detector 1 is obtained by bypassing the higher frequency Fourier components of the measuring signal around a portion of the resistor of the voltage divider 37 via capacitor 36. The error detector variable resistor 18 is made variable such that fine adjustments can be made in the span of measuring voltages which will produce full scale deflection of the recording apparatus. A coarse span adjustment is obtained by variable resistance 32 series connected with the reference cell 31.

Pick-off 39 is variably adjustable along the slide wire 33 to control the zero position of a recording stylus 41 which is mechanically coupled to the mechanical linkage 20 and the pick-off 28.

When the source 11 has a high internal impedance 15 this impedance 15 will add to the resistance of the filter 16 thereby serving to increase the time constant of the low pass filter. In other words, the output of the filter when the source impedance is high is slightly delayed. When such is the case the amount of lead required in the parallel lead compensating network is decreased over a case where the source impedance is low. If the time constant of the parallel lead network 35 is not variably adjustable the measuring network will be overcompensated or overdamped. Accordingly the parallel lead compensating network is provided with an adjustable voltage divider 37 which may be adjusted as desired to provide the desired amount of damping in the servomechanism network.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Graphic recorder apparatus including, a pair of input terminals to which is supplied an unknown D.C. E.M.F. which it is desired to record, means for generating a D.C. output signal representative of the position of a stylus on a recording chart, means for comparing the unknown E.M.F. with the output signal to derive an error signal, rebalance means having substantial inertia and driven by the error signal for rebalancing the recorder by changing the position of said stylus on said recording chart, means forming an electrical feedback path connected between said output signal generating means and said comparing means for transmitting said D.C. output signal to said comparing means, an adjustable phase lead network connected in said feedback path for leading the phase of the output signal applied to said comparing means in order to compensate for the inertia of said rebalance means and to reduce hunting, said phase lead compensating network including a fixed resistance series connected in said feedback path to be traversed by the output signal and forming a D.C. branch of said phase lead compensating network, a fixed capacitor parallel-connected to at least a portion of said D.C. branch of said compensating network and forming a phase lead branch of said phase lead compensating network for leading the phase of transient components of the output signal as transmitted via said feedback path to said comparing means, said phase lead network having a resistance taken through said phase lead branch less than the resistance thereof taken through said D.C. branch, and means for variably adjusting the amount of resistance of said phase lead network taken through said phase lead branch without changing the resistance of said phase lead network taken through said D.C. branch, whereby the time constant of said phase lead network can be varied without changing the resistance offered by said network to the steady state components of said output signal.

2. The apparatus according to claim 1 including, first and second loop circuits having said comparing means common thereto, said first loop circuit coupling said input terminals to said rebalance means, and said second loop circuit forming at least a portion of said feedback path and including said adjustable phase lead compensating network.

3. The apparatus according to claim 2 including a filter capacitor shunting said input terminals of said first loop circuit for low pass filtering undesired signals originating in the source of unknown E.M.F. under measurement.

References Cited in the file of this patent

UNITED STATES PATENTS

| | | |
|---|---|---|
| 2,218,400 | Bel | Oct. 15, 1940 |
| 2,356,617 | Rich | Aug. 22, 1944 |
| 2,367,746 | Williams | Jan. 23, 1945 |
| 2,376,598 | Jones | May 22, 1945 |